(12) United States Patent
Ylä-Outinen et al.

(10) Patent No.: US 9,369,498 B2
(45) Date of Patent: Jun. 14, 2016

(54) MESSAGE-BASED CONVEYANCE OF LOAD CONTROL INFORMATION

(75) Inventors: Petteri Ylä-Outinen, Ojakkala (FI); Mikael Latvala, Helsinki (FI); Lauri Lahtinen, Espoo (FI); Heikki Tuunanen, Espoo (FI); Ilkka Westman, Helsinki (FI); Bernhard Höneisen, Bettwiesen (CH)

(73) Assignee: Nokia Technologies Oy, Espoo (FI)

( * ) Notice: Subject to any disclaimer, the term of this patent is extended or adjusted under 35 U.S.C. 154(b) by 2257 days.

(21) Appl. No.: 10/730,004

(22) Filed: Dec. 9, 2003

(65) Prior Publication Data

US 2004/0152469 A1    Aug. 5, 2004

Related U.S. Application Data

(60) Provisional application No. 60/443,573, filed on Jan. 30, 2003.

(51) Int. Cl.
    *H04L 29/06*    (2006.01)

(52) U.S. Cl.
    CPC ........ H04L 65/1043 (2013.01); H04L 65/1006 (2013.01); *H04L 65/1016* (2013.01)

(58) Field of Classification Search
    USPC ........................................................ 370/389
    See application file for complete search history.

(56) References Cited

U.S. PATENT DOCUMENTS

| | | | | |
|---|---|---|---|---|
| 4,511,895 A * | 4/1985 | Miller et al. | ................... | 370/462 |
| 5,495,426 A * | 2/1996 | Waclawsky et al. | .......... | 370/229 |
| 5,583,996 A * | 12/1996 | Tsuchiya | ....................... | 370/258 |
| 5,898,681 A * | 4/1999 | Dutta | ............................. | 370/229 |
| 5,914,953 A * | 6/1999 | Krause et al. | ................. | 370/389 |
| 5,915,095 A * | 6/1999 | Miskowiec | .................... | 370/255 |
| 5,978,352 A * | 11/1999 | Imaizumi et al. | ............. | 370/216 |
| 6,115,361 A * | 9/2000 | Fredericks et al. | ........... | 370/469 |
| 6,128,279 A * | 10/2000 | O'Neil et al. | ................. | 370/401 |
| 6,185,210 B1 * | 2/2001 | Troxel | ...................... | 370/395.32 |
| 6,279,035 B1 * | 8/2001 | Brown et al. | ................. | 370/412 |
| 6,421,321 B1 * | 7/2002 | Sakagawa et al. | ......... | 370/238.1 |

(Continued)

FOREIGN PATENT DOCUMENTS

| | | |
|---|---|---|
| EP | 1089515 | 4/2001 |
| EP | 1590719 | 1/2004 |

OTHER PUBLICATIONS

Chinese Office Action dated Dec. 4, 2009, issued by the State Intellectual Property Office, in connection with counterpart Chinese patent application No. 200480031023.

(Continued)

*Primary Examiner* — Chirag Shah
*Assistant Examiner* — Joshua Smith
(74) *Attorney, Agent, or Firm* — Mintz Levin Cohn Ferris Glovsky and Popeo, P.C.

(57) ABSTRACT

The present invention relates to a method and a system for controlling a processing load in a packet data network, wherein a load control information is set in a predetermined field of a message. The load control information is then checked on the routing path of the message and a processing resource of the packet data network is selected in response to the result of checking step. Thereby, load balancing information can be provided at the network to thereby provide an efficient balancing and load sharing function without heavy string comparisons and data base queries.

26 Claims, 5 Drawing Sheets

(56) References Cited

U.S. PATENT DOCUMENTS

| | | | |
|---|---|---|---|
| 6,452,921 B1 * | 9/2002 | Alexander et al. | 370/351 |
| 6,501,767 B1 * | 12/2002 | Inoue et al. | 370/401 |
| 6,625,156 B2 * | 9/2003 | Shaio et al. | 370/351 |
| 6,678,735 B1 * | 1/2004 | Orton et al. | 370/393 |
| 6,834,054 B1 * | 12/2004 | Dumortier et al. | 370/400 |
| 6,888,828 B1 * | 5/2005 | Partanen et al. | 370/389 |
| 6,947,401 B2 * | 9/2005 | El-Malki et al. | 370/331 |
| 6,985,458 B2 * | 1/2006 | Freedman et al. | 370/321 |
| 7,016,367 B1 * | 3/2006 | Dyckerhoff et al. | 370/429 |
| 7,039,048 B1 * | 5/2006 | Monta et al. | 370/389 |
| 7,139,282 B1 * | 11/2006 | Dyckerhoff et al. | 370/428 |
| 7,177,642 B2 * | 2/2007 | Sanchez Herrero et al. | 455/435.1 |
| 7,197,044 B1 * | 3/2007 | Kadambi et al. | 370/418 |
| 7,283,538 B2 * | 10/2007 | Pham et al. | 370/401 |
| 7,372,813 B1 * | 5/2008 | Cimino et al. | 370/389 |
| 2001/0046223 A1 * | 11/2001 | Malki et al. | 370/338 |
| 2002/0161890 A1 * | 10/2002 | Chen | 709/226 |
| 2002/0184376 A1 | 12/2002 | Sternagle | |
| 2003/0012216 A1 * | 1/2003 | Novaes | 370/252 |
| 2003/0016624 A1 * | 1/2003 | Bare | 370/252 |
| 2003/0110257 A1 * | 6/2003 | Hyun et al. | 709/224 |
| 2003/0112829 A1 * | 6/2003 | Sridhar | 370/522 |
| 2003/0142685 A1 * | 7/2003 | Bare | 370/410 |
| 2003/0217096 A1 * | 11/2003 | McKelvie et al. | 709/202 |
| 2004/0001444 A1 * | 1/2004 | Sadot et al. | 370/252 |
| 2004/0057449 A1 * | 3/2004 | Black | 370/432 |

OTHER PUBLICATIONS

"3rd Generation Partnership Project; Technical Specification Group Services and System Aspects; IP Multimedia Subsystem (IMS); Stage 2 (Release 6)". 3GPP TS 23.228. V6.3.0. Sep. 2003. <<downloaded Dec. 3, 2015>>.

* cited by examiner

MESSAGE-BASED CONVEYANCE OF LOAD CONTROL INFORMATION

The present application claims the benefit of priority of provisional application Ser. No. 60/443,573, filed Jan. 30, 2003, the contents of which are incorporated herein by reference.

FIELD OF THE INVENTION

The present invention relates to a method and system for controlling processing load in a packet data network, such as an Internet Protocol (IP) Multimedia Subsystem (IMS) provided on top of a packet data network to offer voice and multimedia services e.g. for third generation mobile devices.

BACKGROUND OF THE INVENTION

It is assumed that in the future almost all fixed and mobile communications networks will be based on Internet technology. Especially, services combining several communication types and modes will lead the way in future networks. Voice itself will be just one, although important, piece in the whole communication architecture.

The Session Initiation Protocol (SIP) as defined in the Internet Engineering Task Force (IETF) specification RFC 3261, provides an emerging standard for setting up multimedia sessions on the Internet. Its basic capabilities are setup modification and tear down of any communication session, so it is a signaling protocol. SIP also provides personal mobility, meaning that a consumer is reachable via a single address regardless of its current point of attachment to the network.

In order to support multimedia services, seamless mobility and efficient multiparty conferencing, the IP layer needs to be enhanced. Mobile IP allows terminals to move freely between different mobile networks. SIP is used to establish, modify and terminate sessions. It provides personal mobility by allowing a user to dynamically register to the network with his communication address, i.e. SIP URI (Uniform Resource Indicator). A session is usually a number of Real-time Transport Protocol (RTP) streams to be exchanged. Normally, a session is a combination of speech, audio and video streams, but it may also contain shared applications. A basic SIP network is composed of four types of elements i.e. User Agents (UA), Proxy Servers, Redirect Servers and Registrar Servers. User Agents typically reside in endpoints such as IP phones, personal computers or mobile devices. They initiate requests and provide responses. Usually, UAs also have an interface to media handling and to the actual application software providing the user interface. Proxy servers are intermediaries, which receive and forward requests providing them with, e.g., routing or other services. Redirect servers simply respond to a request by asking its originator to redirect it to a new address. Registrar servers keep track on the actual points of contact of the consumers by accepting registrations from the UAs. Registrar servers and the SIP registration procedure in general provide user mobility as the consumer is able to be reachable from any location via a single address. In this sense, they resemble Home Location Register (HLR) functionality in the Global System for Mobile communications (GSM) networks. Each consumer is part of a domain and each domain runs at least one registrar server, which knows the location of its consumers if the are registered.

SIP uses an address format common to Internet Mail, i.e. "user@domain". The domain part is used to find the correct domain for the consumer and the user part is used to distinguish between individual consumers within a domain. SIP includes request and response messages comprising header fields, e.g. for defining where the request is to be sent next, the recipient address, the sender address etc. Furthermore, a SIP message may contain a payload portion for transmitting subscriber or service specific information.

It is noted that RTP streams do not follow the same path as the SIP message did, but flow directly between the concerned devices. It is thus possible to send the subsequent SIP requests directly between the UAs. In IMS, subsequent SIP messages follow the path recorded into the Record-Route header of the initial request, while interrogating network nodes may drop themselves out and other network elements stay on path. On the other hand, proxy servers in the middle may ask to remain on the signaling path for the duration of the call. This might be useful if the proxy offers some services to the call.

Currently, the Third Generation Partnership Project (3GPP) is specifying IMS e.g. in its specification TS 23.228 as an access independent subsystem which can be used in connection with different networks. IMS uses SIP for session initiation. Basically IMS is just an instance of a SIP network. It has a number of proxies and a registrar. The UA is situated in the terminal device or user equipment (UE). When two devices establish a session they talk to each other via Call State Control Function or Call Session Control Function (CSCF) elements, while RTP media flows do not go via CSCFs but go directly between the devices. An Application Server (AS) is a SIP element dealing with services, such as advanced call control, presence or instant messaging. The AS may terminate sessions/transactions. The AS may also start sessions/transactions e.g. on behalf of a user or a service.

However, there may be situations where the AS does not know whether it should start originating or terminating services when it receives an incoming request message, e.g. an SIP INVITE message, or a serving CSCF (S-CSCF) does not know whether the incoming request message starts an originating or terminating session/transaction. Moreover, other information may be needed for load balancing within the network. Furthermore, for load sharing purposes in a connection processing server (CPS), especially in the S-CSCF and an interrogating CSCF (I-CSCF), it is important to provide a fast and easy algorithm to discover whether a received SIP request is the first in a SIP session or to which SIP session a received request or response belongs to. Currently, SIP does not provide such an efficient means. In order to identify a SIP dialog, i.e. call leg, identified by a combination of call identification, source and destination, a network element or UE has to compare the respective header fields of each SIP message and then to determine whether the call leg already exists. This implies heavy string comparisons and data base queries. A network element which maintains a high number of parallel call legs needs a lot of resources. Additionally, in case of a failure in a network element, information is required about existing sessions.

SUMMARY OF THE INVENTION

It is therefore an object of the present invention to provide an efficient load control scheme for packet data networks.

This object is achieved by a method of controlling processing load in a packet data network, said method comprising the steps of:

setting a load control information in a predetermined field of a message;

routing said message through that packet data network;

checking said load control information on the routing path of said message and/or on the routing path of a response message to said message; and selecting a processing resource of said packet data network in response to the result of said checking step.

Furthermore, the above object is achieved by a network device for controlling processing load in a packet data network, said device comprising: checking means for checking a load control information provided in a predetermined field of a message or response message; and selecting means for selecting a processing resource for said message or response message in response to said checking means.

Additionally, the above object is achieved by a device for transmitting a message to a packet data network, said device being arranged to set into a predetermined field of said message a load control information for selecting processing resources of said packet data network.

Moreover, the above object is achieved by a method of distributing load control information in a packet switched network, comprising the steps of:
- creating a first load control information in a first network element;
- setting said first load control information into a predetermined field of a message;
- routing said message to a second network element;
- storing said first load control information in said second network element;
- creating a second load control information in said second network element;
- setting said second load control information into a predetermined field of a second message;
- routing said second message to said first network element; and
- storing said second load control information at said first network element.

In addition, the above object is achieved by a system for controlling processing load in a packet data network, said system comprising:
- a first network element for setting a load control information in a predetermined field of a message to be routed in said packet data network; and
- a second network element for checking said load control information on the routing path of said message; and for selecting a processing resource of said packet data network in response to the result of said checking step.

Finally, the above object is achieved by a system for distributing load control information in a packet switched network, said system comprising:
- a first network element for creating a first load control information and for setting said first load control information into a predetermined field of a message; and
- a second network element for receiving said message, for storing said first load control information, for creating a second load control information, for setting said second load control information into a predetermined field of a second message, and for routing said second load control information to said first network element;

wherein said first network element is adapted to store said second load control information.

Accordingly, load sharing or load balancing information can be routed in messages to the respective network nodes or servers to thereby reduce the amount of resources required for the load control functionality. Moreover, information about existing sessions can be provided in case of failures of network elements.

The predetermined field may be a via branch of a SIP message. The load balancing information may be copied from another predetermined field to said predetermined field.

The predetermined field may be a subfield of a user part of an address header, e.g. a URI of the SIP Route header.

Thereby, additional information can be conveyed in the user part. In particular, company confidential information can be carried in one or more subfields e.g., encrypted and/or tokenised and/or encoded information. Furthermore, routing inside a network element, e.g., choosing a correct call state model (for example for originating or terminating session/transaction case) can be conducted using the subfield or subfields of the user part. The load control information and/or other control information may be a subscriber and/or service and/or server specific information carried in one or more subfields e.g., from an S-CSCF to an AS. Alternatively, an IP address may be carried in the subfield, which may be an address of the host in the domain part.

Thus, a plurality of subfields can be provided in the user part for conveying different types of said load control information and/or the other control information. In particular, the user part may be parsed and divided into the subfields. Alternatively, at least one of structure, order and usage of the subfields may be predetermined, e.g., on a standardised basis. The subfields may be separated by a predetermined bit string, character, character string, or other separator.

The selection step may be used for load balancing. A virtual address used for distributing the message to a predetermined processor node. The virtual address may be shared by a plurality of processor nodes. These processor nodes may have a call state control functionality of an IP-based cellular network. Thus, a mechanism to ensure even load balancing is provided, and a subscriber can be tied to as processor node for the whole registration period. By using a virtual address, a cluster itself can do load balancing for cluster nodes.

Additionally, the load control information may comprise a first port number indicating a first port for receiving a request message. Furthermore, the load control information may comprise a second port number indicating a second port for receiving a response message. Thereby, requests and responses can be received at the indicated port where a load balancing information is provided.

In another aspect, the load control information may comprise a first information and an optional second information. The first and optional second information may be set in a header field selected from a Route header field, Via header field, or Contact header field of a SIP message. The first information may indicate whether a session of the message already exists. The optional second information may then indicate an identification of the existing session. The first and second information may be a hidden information not meaningful to other networks.

Accordingly two alternatives can be provided. In the first alternative, it is only detected whether the message is the first one in a call leg. Thereby, easy and fast recognition of the first message in a session can be provided. No change to other network elements or terminals is required. The scheme may even be provided on a non-standardised basis. In the second alternative, an additional session identification is detected based on the second information. Thereby, in addition to the above advantages of the first alternative, easy and fast recognition of the session in question can be provided.

In particular, the first and/or second information may be set as a part of user part in an address (e.g. SIP URI) of a header field, as a part of host name of a header field, as a part of domain name of a header field, as a parameter of the header field, as a port number of the header field, wherein the port number may be used for differentiating a first message from subsequent messages, or as an extension header field to the message. Alternatively, the first and/or second information may be set in a payload portion of the message.

The second information may then be extracted in response to a detection of the first information, and may be used in the selection step. The network device for controlling the processing load may comprise a call state or call session control functionality of an IP-based cellular network. The selecting means may be arranged to select a predetermined processor node to which said message is distributed. Thus, in addition to the virtual address, the load control information specifies the processor node.

The selecting means may be arranged to initiate creation of a new session. The device for transmitting the message may also comprise call state control functionality or call session control functionality of the IP-based cellular network. This session control functionality may be a serving call session control functionality, an interrogating call session control functionality or a proxy call session control functionality. The device may be arranged to set the load control information in the user part of the header address of the message, or, alternatively, in a host name, domain name, header parameter, port number, or extension header field of a header portion or in a payload portion of the message.

Other advantageous developments of the present invention are defined in the dependent claims.

BRIEF DESCRIPTION OF THE DRAWINGS

The present invention will now be described on a basis of preferred embodiments with reference to the accompanying drawings, in which.

DESCRIPTION OF THE PREFERRED EMBODIMENT

Figure 1:
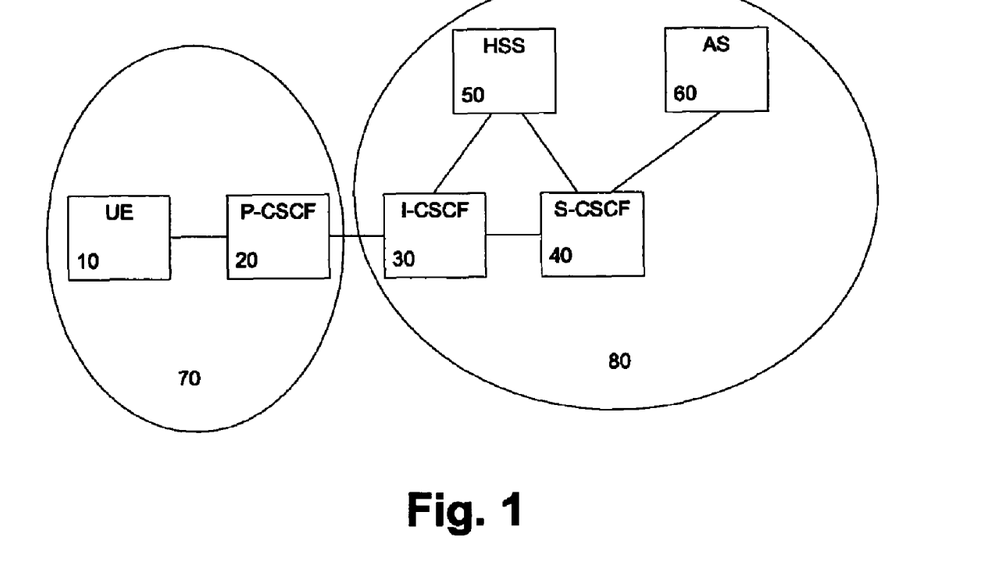
FIG. 1 shows an IMS network architecture in which the present invention can be implemented.

The preferred embodiments will now be described on the basis of an IMS network architecture as shown in FIG. 1.

It is noted that FIG. 1 only shows those IMS components required for a description of the present invention. As an example, the radio access network and the core network are not shown in FIG. 1. According to FIG. 1, a terminal device or UE 10, which may be a mobile or cellular terminal device, is connected to a P-CSCF 20 arranged in a visited domain 70 of the UE 10 and providing basic IP connectivity and mobile management below it. The UE 10 uses SIP to communicate with the P-CSCF 20 which is similar to a SIP proxy server. In the present case, the consumer or subscriber of the UE 10 is roaming in the visited domain 70 where the P-CSCF 20 is located. The role of the P-CSCF 20 is to provide emergency call and other such services requiring specific knowledge of the visited domain 70. Instead of radio access network also alternative access networks may be used. Instead of mobile or cellular terminal device also other kind of terminals may be used, especially in alternative access networks.

Furthermore, an S-CSCF 40 is always located in the subscriber's or consumer's home domain 80 and takes the role of the SIP registrar and proxy servers, so that the UE 10 can be registered at the S-CSCF 40 using SIP via the P-CSCF 20. Furthermore, an I-CSCF 30 is provided as another SIP proxy server responsible mainly for finding the correct S-CSCF for a given subscriber or consumer. The S-CSCFs can be dynamically allocated per registration in order to achieve efficient load balancing and error residency. An Application Server (AS) 60 is provided as a SIP element dealing with the services provided to the UE 10. Separate ASs can be provided for different purposes. Finally, a Home Subscriber Server (HSS) 50 is arranged for profile management and authentication.

In the following, a first preferred embodiment of the present invention will be described on the basis of FIGS. 2 to 6.

In the first preferred embodiment, a content of a user part of SIP URI is used for load control, e.g., session control and load balancing. In particular, the user part of the SIP URI (Uniform Resource Identifier) can be divided into subfields which may be utilized e.g. for control and/or routing purposes. In SIP, the Route Header normally contains SIP URIs which have only a domain part, such that the user part is free to be used for other purposes.

Figure 2:
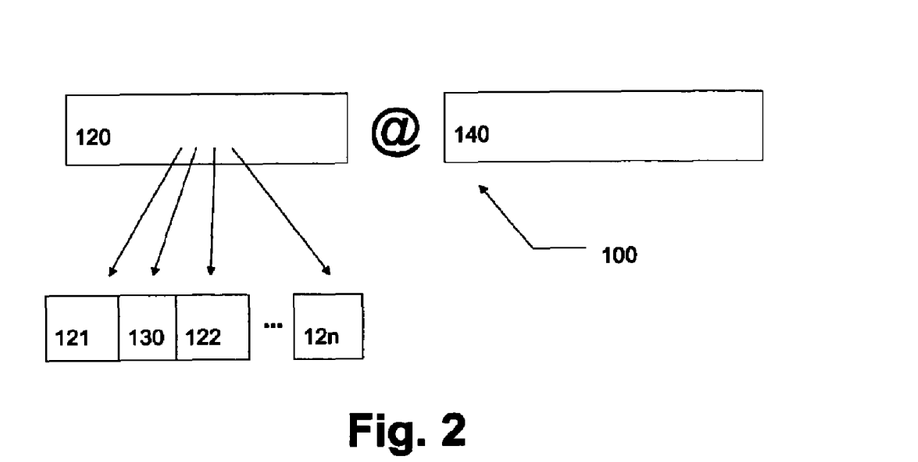
FIG. 2 shows a structure of an SIP URI according to the first preferred embodiment.

FIG. 2 shows a schematic diagram indicating a structure of the FQDN or SIP URI 100 according to the first preferred embodiment. The SIP URI 100 comprises a user part 120 and a domain part 140 separated by an "@" sign, similar to an e-mail address. The objects addressed by SIP are users at hosts, identified by the SIP URI 100. The user part 120 is used for carrying a user name or a telephone number, while the host or domain part 140 carries either a domain name or a numeric network address.

Due to the fact that the user part is not used in the Route header neither in the Via header, it can be divided into subfields 121, 122, ... 12n, which may be separated by a suitable separator 130, e.g. a bit string, character or character string, wherein the characters can be printable and/or non-printable characters or bit strings. The order and usage of the subfields 121 to 12n can be predetermined or standardized if not considered as an implementation specific information.

Regarding the arrangement and structure of the subfields 121 to 12n in the user part 120, three options may be used. According to the first option, the user part 120 may be arranged as a single field, which contains the subfields 121 to 12n. This single field is then parsed and divided into the subfields 121 to 12n, when needed. This provides the advantage that no standardization is needed if the field is created and utilized inside the same network.

According to the second option, the user part 120 may structurally consist of the subfields 121 to 12n, while the syntax and possibly also the semantics of the subfields 121 to 12n are predefined or standardized. In this case, the subfields 121 to 12n can be created and utilized even in different networks.

According to the third option, a combination of the first and second option may be used.

The following is an example of the SIP URI 100 where a second subfield is used for signaling the session/transaction case and a first subfield is used for signaling an implementation specific information. The separator 130 is formed by the corrector "_":

57BC442C_terminating@s-cscf2.ims.sonera.fi

Accordingly, "terminating" is signaled as the session/transaction case and "57BC442C" is signaled as the implementation-specific information.

In the following, first and second examples of a load control mechanism according to the first preferred embodiment are described with reference to FIGS. 3 and 4.

The load control mechanism is provided to ensure even load balancing if a network element or part is implemented by a number of processor nodes. In the IMS network architecture according to FIG. 1, the UE 10 has the P-CSCF 20 as a contact point to the network. Between the UE 10 and the P-CSCF 20, an IP security function IPSec is used for integrity and confidentiality protection. Furthermore, a compression function may be used to compress the signaling information in the prefix or user part 120 of the FQDN or SIP URI 100 of the UE 10. In order to achieve high capacity and fast response times, the IPSec data and compression data of the particular subscriber of the UE 10 must be stored in a memory e.g. volatile memory or random access memory (RAM). As a result a subscriber should be tied to the processor node to which it is registered. By using the virtual address, only the node or server cluster itself can do load balancing for cluster nodes.

Figure 3:
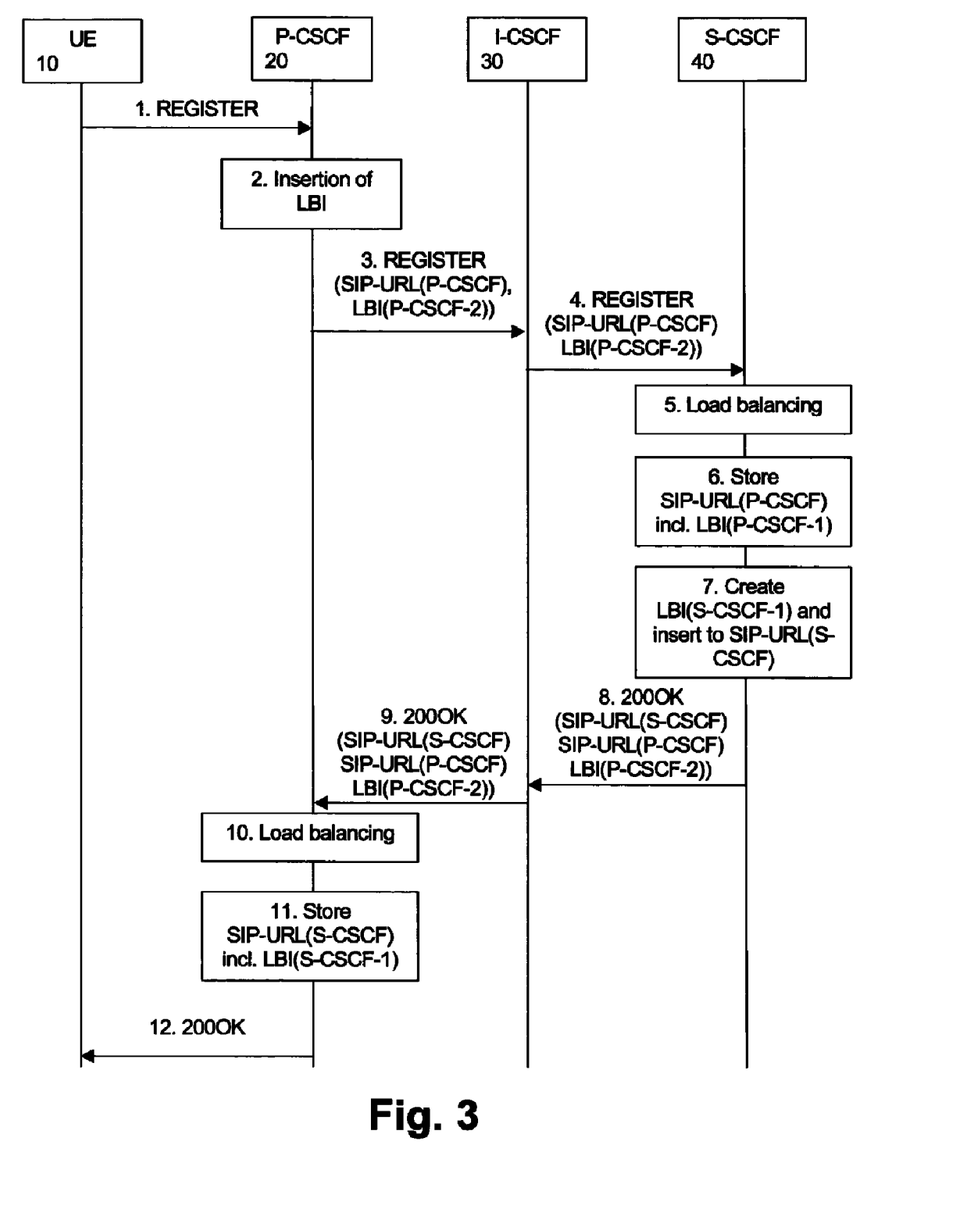
FIG. 3 shows a signalling and processing diagram of a first signalling example according to the first preferred embodiment.

FIG. 3 shows a signaling and processing diagram of a load control mechanism for distributing a load balancing information (LBI) upon registration of a user. Here, reasoning for load balancing is that e.g. compression is done at distributed nodes. Therefore, in practice at the interface between the UE 10 and the P-CSCF 20 load balancing cannot be done based on SIP level information since it is compressed. At this interface reasonable load balancing key is the IP-address of the UE 10. When a terminating attempt or request is received, which is targeted to the UE 10 it is essential that the terminating attempt is received at the same processing node to which messages from the UE 10 are distributed. Thereby, unnecessary hops can be avoided in the IP-based network.

When the UE 10 transmits in step 1 a SIP Register message, the P-CSCF 20 creates and inserts in step 2 a first load balancing information LBI(P-CSCF-1) to SIP-URL(P-CSCF) of the Path field of the header of that Register message. The first load balancing information LBI(P-CSCF-1) in the Path field will be received in future when an initial request is received from the S-CSCF 40. The P-CSCF 20 also creates and inserts a second load balancing information LBI(P-CSCF-2) to the Via branch at that Register message. The second load balancing information LBI(P-CSCF-2) at the Via branch will be received along with a response to that Register message. The first and second load balancing information LBI(P-CSCF-1) and LBI(P-CSCF-2) may be identical or different. The register message is routed in step 3 and 4 via the I-CSCF 30 to the S-CSCF 40. When the S-CSCF 40 receives the Register message from the P-CSCF 20, it does load balancing in step 5 based on e.g. the Call ID. In step 6, the S-CSCF 40 then stores to a subscriber database the SIP-URL(P-CSCF) from the Path field, which contains the first load balancing information LBI(P-CSCF-1) of the P-CSCF 20. In step 7, the S-CSCF 40 creates an own load balancing information LBI(S-CSCF-1) and inserts it to the SIP-URL(S-CSCF) of the Service-Route field of the SIP 200OK response message sent in steps 8 and 9 via the I-CSCF 30 to the P-CSCF 20. This load balancing information LBI(S-CSCF-1) will be received in future when an initial request is received from the P-CSCF 20. In addition, the Via branch contains the SIP-URL(P-CSCF) of the P-CSCF 20 which has been copied from the Register message received after step 4. When the P-CSCF 20 receives this 200OK response message, load balancing can be done in step 10 based on the second load balancing information LBI(P-CSCF-2) obtained from the Via branch. In step 11, the P-CSCF 20 stores in a database the SIP-URL(S-CSCF) containing the load balancing information LBI(S-CSCF-1) of the S-CSCF 40 obtained from the Service Route field of the 200OK response message. Finally, in step 12, the 200OK response message indicating successful registration is forwarded to the UE 10.

Accordingly, after the above procedure, the P-CSCF 20 has the SIP-URL(S-CSCF) at its subscriber data which points to the S-CSCF 40 and which contains the corresponding load balancing information LBI(S-CSCF-1). Similarly, the S-CSCF 40 has the SIP-URL(P-CSCF) at its subscriber data which points to the P-CSCF 20 and which contains the corresponding load balancing information LBI(P-CSCF-1). The load balancing information can thus be used later by the respective load balancers of the P-CSCF 20 and the S-CSCF 40. For example, when a terminating attempt happens, the S-CSCF 40 then fetches this load balancing information from the subscriber database and inserts it to the corresponding request.

Figure 4:
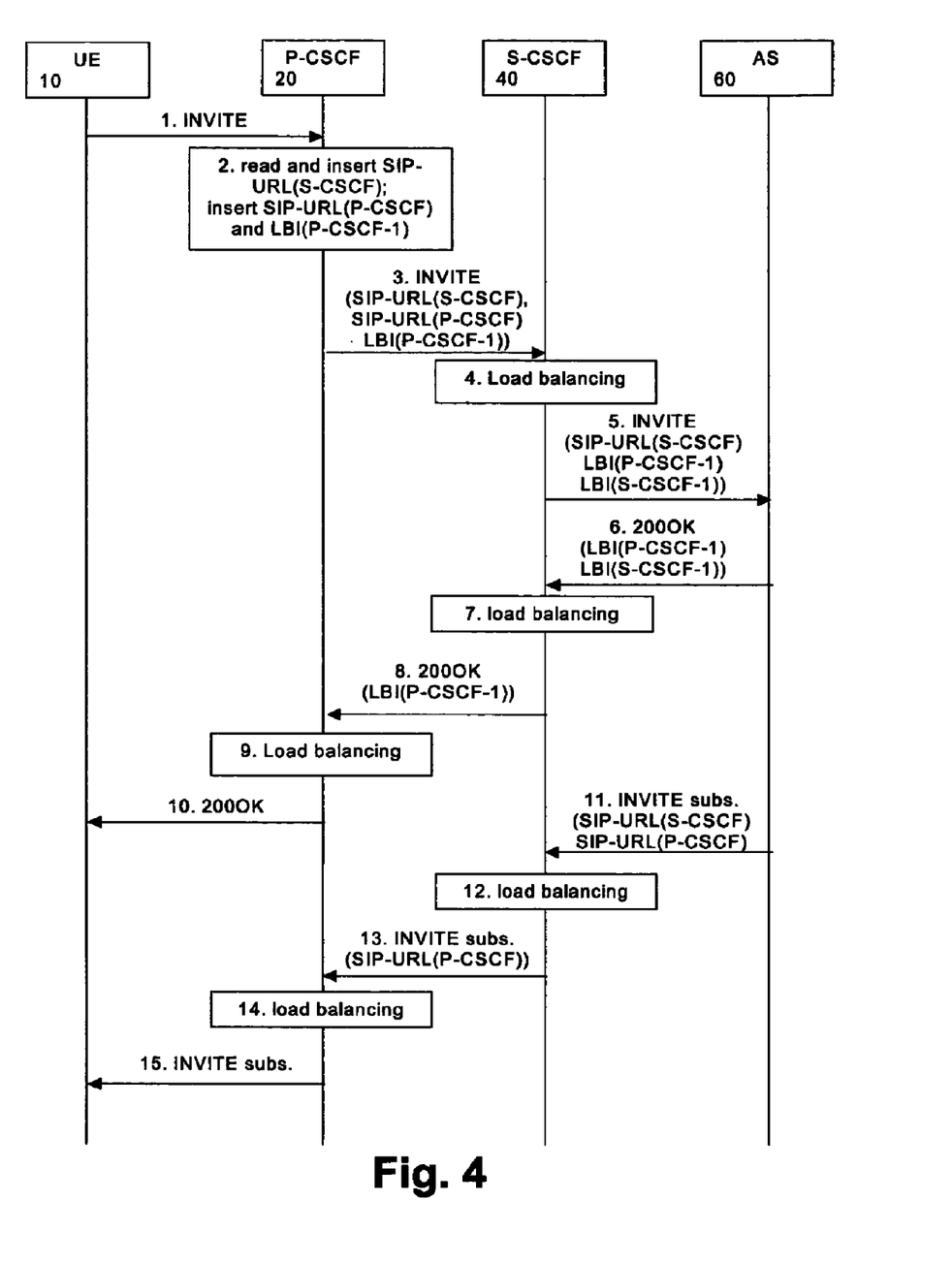
FIG. 4 shows a processing and signalling diagram indicating a second signalling example according to the first preferred embodiment.

FIG. 4 shows a processing and signaling diagram of a load control mechanism for using the load balancing information (LBI) when an initiation request is sent to the network. When the UE 10 sends in step 1 a SIP Invite message to the P-CSCF 20, load balancing is done based on the IP address of the UE 10. In step 2, the P-CSCF 20 reads from the subscriber database the previously stored SIP-URL(S-CSCF) to be used for routing the Invite message to the S-CSCF 40 in step 3. Additionally, the SIP-URL(S-CSCF) is inserted to the topmost Route field, and the SIP-URL(P-CSCF) is inserted to the Record-Route field. Moreover, the first load balancing information LBI(P-CSCF-1) is inserted to the Via branch. When the Invite message is received at the S-CSCF 40, it obtains from the topmost Route field the SIP-URL(S-CSCF) which contains its previously set load balancing information LBI(S-CSCF-1). Based on this load balancing information LBI(S-CSCF-1) load balancing is done in step 4 to find a correct computer. When the S-CSCF 40 sends the Invite message in step 5, it inserts the SIP-URL(S-CSCF) to the Record-Route field and inserts its load balancing information LBI(S-CSCF-1) to the Via branch. In step 6, the application server 60 responds with a 200OK response message comprising the load balancing information LBI(P-CSCF-1) and LBI(S-CSCF-1) of the P-CSCF 20 and the S-CSCF 40 in the Via branch. When the S-CSCF 40 receives the 200OK response message, it obtains its load balancing information LBI(S-CSCF-1) from the Via branch and uses it for load balancing in step 7. Similarly, when the P-CSCF 20 subsequently receives the 200OK response message forwarded by the S-CSCF 40 in step 8, it obtains its first load balancing information LBI(P-CSCF-1) from the Via branch and uses it for load balancing in step 9. In step 10, the 200OK message is forwarded the UE 10 to acknowledge the previous Invite message.

When the application server 60 sends in step 11 a subsequent SIP request, e.g., an Invite message, within a dialog, it uses a Route list which it has previously created based on the Record-Route entries of the initial request, i.e. Invite message received after step 5. The topmost Route entry is the SIP-URL (S-CSCF) including the corresponding load balance information LBI(S-CSCF-1) therein. The second Route entry is the SIP-URL(P-CSCF) including the corresponding load balance information LBI(P-CSCF-1) therein. When the S-CSCF 40 receives the subsequent Invite message, it obtains from the topmost Route entry its load balancing information LBI(S-CSCF-1) which is inside the SIP-URL(S-CSCF). In step 12, the S-CSCF 40 does load balancing based on this load balancing information LBI(S-CSCF-1) and removes the Route entry pointing to itself. Now, the topmost Route entry points to the P-CSCF 20. In step 13, the subsequent Invite message is forwarded to the P-CSCF 20. When the P-CSCF 20 receives the subsequent Invite message, it obtains from the topmost Route entry its load balancing information LBI(P-CSCF-1) which is provided inside the SIP-URL(P-CSCF). Then, it does load balancing based on this load balancing information LBI(P-CSCF-1) in step 14, and removes the Route entry pointing to itself. Finally, in step 15, the Invite message is forwarded to the UE 10.

In general, at the registration phase the path and load balancing information is recorded and stored to be used later for requests. The later request should contain this load balancing information and load balancing is then done based on that load balancing information. Accordingly, any load balancing information inserted during the registration phase is for future requests.

In all cases, the via-branch parameter of the Via header field may be used to carry similar information used by the load balancing function to distribute responses to the correct processor node.

Furthermore, different port numbers may be used to identify where the load balancing information can be found. In particular, during "path recording", the request port is set to the domain part 140 of the SIP URI 120. Thus, requests are then received at that request port and it is known where to read the load balancing information. Similar, "port" can be set for out going requests, such that responses are received at that port.

In case of a load balancing function for an ingress or incoming SIP traffic which is destined to the concerned network element, the destination IP address is checked whether it is a virtual IP address or not. If not, load balancing is not needed, e.g. normal L3 routing can then be applied for packet. If the destination IP address is a virtual IP address, then load balancing is needed. There are two choices, i.e., the virtual IP address can be either a P-CSCF address or it can be an S-CSCF or I-CSCF address. A corresponding destination port information is used to detect the kind and location of the load balancing information. Then, load balancing is done based on the load balancing information and the resulting output corresponds to the correct processing node to where packets should be forwarded. The load balancing information may be a call id, UE-IP-address, or a previously generated load balancing information.

In case of an egress or outgoing traffic which is originated from the concerned network element, the source IP-address is checked whether it is one of the virtual IP-addresses (P-CSCF, S-CSCF or I-CSCF) of the CPS. If not, then normal routing happens. If yes, it is checked if it is a Loop address. If so, the transport protocol is determined and subsequently the destination port is checked to determine a request port or dedicated port. Based on the checking result a procedure for obtaining the load balancing information and forwarding the IP packet is selected. In case of a Not-Loop Address, the source IP-address is again checked to determine whether it is an S-CSCF/I-CSCF address or a P-CSCF address. If it is an S-CSCF/I-CSCF address, the transport protocol, i.e. Transmission Control Protocol (TCP) or User Datagram Protocol (UDP), is determined. If TCP is indicated, the SIP message is reassembled after buffering and then forwarded. If UDP is indicated, the IP packet can be directly forwarded. If it is P-CSCF address, the source port is determined. If a Client port or Request port is indicated, the transport protocol is determined and the above processing is again initiated. In case a UE unsecure/secure client/server port is indicated, the IP packet is directly forwarded by an L3 (Protocol Layer 3) procedure.

In the following, the second preferred embodiment of the present invention is described with reference to FIGS. 5 to 7. The second preferred embodiment is directed to a load sharing mechanism for discovering in an efficient way which SIP traffic belongs to which session, and whether a request, e.g. a SIP INVITE request, is an initial request or a re-request.

Figure 5:
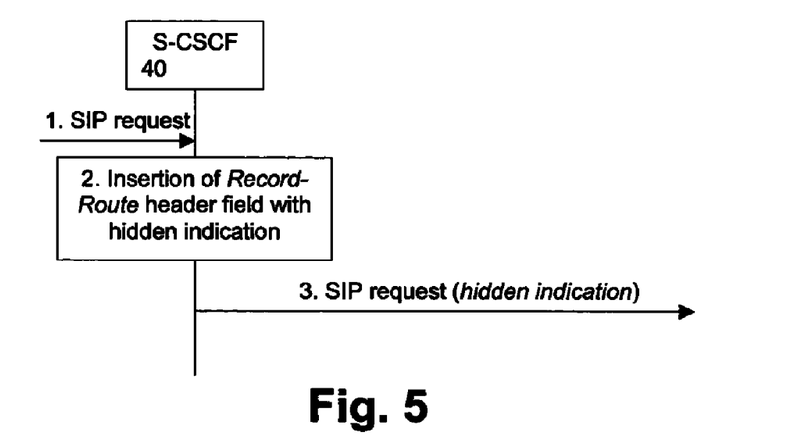
FIG. 5 shows a signalling and processing diagram according to a second preferred embodiment.

FIG. 5 shows a processing and signaling diagram indicating a first example of the load sharing mechanism according to the second preferred embodiment. The mechanism of the first example is adapted to detect, whether a SIP request, e.g. SIP INVITE is the first one in a call leg. This is achieved by providing a hidden information in the Record-Route header field of the SIP request.

Whenever a session-stateful CSCF, e.g. the S-CSCF 40 in FIG. 1, receives a SIP request and inserts a Record-Route header field (step 1), it inserts a hidden indication into the Record-Route header field (step 2), and forwards the SIP request with the hidden indication towards the destination address. In the present case, "hidden" means that the indication is not meaningful to other networks, e.g. networks outside the network where the indication is set. However, if required, the added indication may as well be a standardized information readable by other networks.

Then, whenever an INVITE arrives, a session-stateful CSCF checks, whether the topmost Route header field or request URI (if there is no Route header) contains such a hidden information. The Route header field is constructed from the Record-Route header field. If the hidden information or indication is present, the session is already existing. If not, a new session has to be created internally in the concerned session-stateful CSCF.

As SIP responses (e.g. 200 OK) in normal case belong to an existing session, they don't need to be distinguished.

The indication can be part of the hostname. As an example, it is assumed the default routing address to this element would be
<scscf17.operator.net> such as <B@provider.net; maddr=scscf17.operator.net>, the Record-Route could then look like:
RecordRoute:                             <B@provider.net;
   maddr=exist.scscf17.operator.net>
or
Record-Route: <B@exist.provider.net>
or
Record-Route: <B@exist.scscf17.operator.net>.
Here the hidden indication would be "exist." as part of the hostname. The user part 120 may be empty in these examples. E.g., instead of <B@exist.scscf17.operator.net> the following may be used: <exist.scscf17.operator.net>. The Route header field is constructed from the Record-Route header field. For example:
Record-Route: <B@exist.scscf17.operator.net>
gives
Route: <B@exist.scscf17.operator.net>.
As an alternative, the S-CSCF 40 may add an "rr-param" to the Record-Route header field as defined in RFC3261:
   Record-Route="Record-Route" HCOLON rec-route * (COMMA rec-route)
   rec-route=name-addr *(SEMI rr-param)
   rr-param=generic-param
   generic-param=token [EQUAL gen-value]
   gen-value=token/host/quoted-string $$token = 1 * (alphanum/"-"/"."/"!"/"\%"/"*"$$
$$/"\_"/"+"/"`"/"'"/" \sim ")$$

Route="Route" HCOLON route-param *(COMMA route-param)
route-param=name-addr *(SEMI rr-param)
A corresponding example may look as follows:
RecordRoute: <B@provider.net; maddr=scscf17.operator.net; existing>
or
Record-Route: <B@provider.net; existing>
or
Record-Route: <B@scscf17.operator.net; existing>.

Again, the user part 120 may be empty. The Route header field is constructed from the Record-Route header field.

If the rr-param "existing" is received, it can easily be detected that the request belongs to an existing session.

According to a further alternative, different port numbers may be used for the first and for the subsequent requests. As an example, it is assumed that the default routing to the concerned element or node would be <B@provider.net; maddr=scscf17.operator.net>. Then, the RecordRoute entry could look like:
RecordRoute: <B@provider.net; maddr=scscf17.operator.net:19373>
or
Record-Route: <B@provider.net.19373>
or
Record-Route: <B@scscf17.operator.net.19373>.

And here again, the user part 120 may be empty. The Route header field is constructed from the Record-Route header field. For example
Record-Route: <B@provider.net; maddr=scscf17.operator.net.19373>
gives
Route: <B@provider.net; maddr=scscf17.operator.net.19373>.

All the requests, which arrive at port 19373, would be recognized as belonging to an existing session.

According to another alternative, a new proprietary or non-standardized extension header field may be used in SIP to convey the information. An example of the new header entry may look as follows:
CSCF-session: existing in scscf17.operator.net However, in this case, the UA would have to support this feature, i.e. copying this new header field from the SIP requests to the SIP responses and subsequent SIP requests.

According to a still other alternative, the payload portion of the SIP request could be used for conveying the hidden indication.

Figure 6:
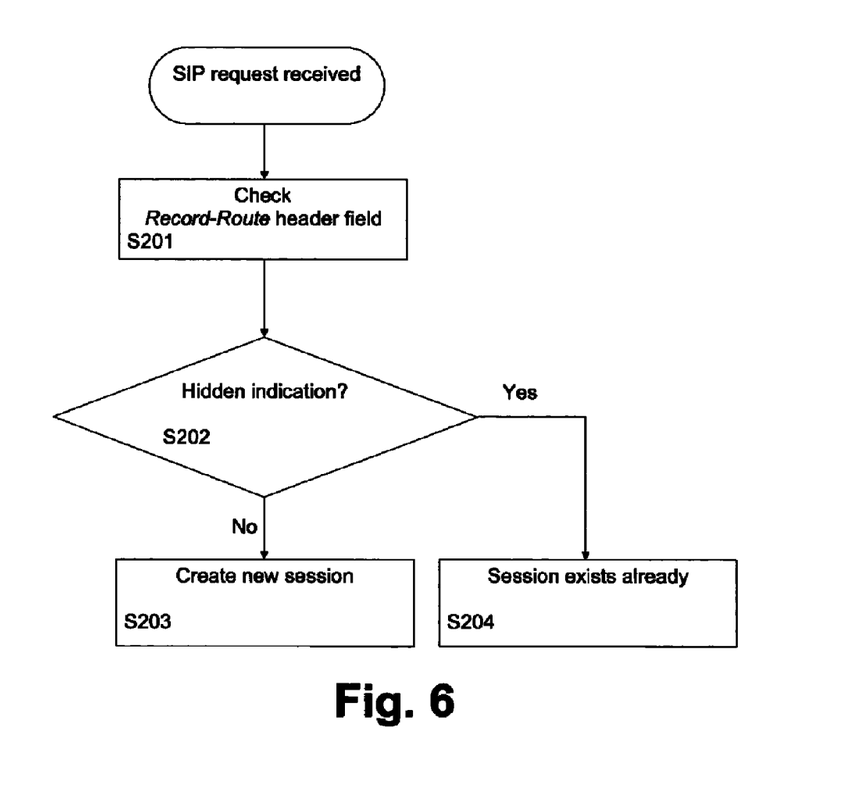
FIG. 6 shows a flow diagram of a first example of a load sharing mechanism according to the second preferred embodiment.

FIG. 6 shows a schematic flow diagram indicating the load sharing mechanism according to the first example. When an initial request is handled by the element, Record-Route header can be inserted to the request before sent out. To this Record-Route header a hidden information can be added. Later these Record-Route headers are passed back within response to the originator of the request. When the originator gets this response, it gets those Record-Route headers and copies them to the Route list. When the originator sends subsequent request, it takes this Route list and inserts all entries to the subsequent request as Route headers. Now subsequent request can be sent out. When the next server receives this request, it can find from the Route header same SIP URI it inserted earlier to initial request.

A Via header is also inserted to the request. Same Via header is received in the response to the request, and hidden information in the Via header can be used to find the instance or element to which the response must be passed.

Thus, according to FIG. 6, if a SIP request is received, the Route header field, or new header field or payload portion, is checked for the hidden indication (step S201). If a hidden indication is detected in step S202, a session is already existing and no creation is required and the request can be allocated to the call leg of the existing session (step S204). On the other hand, if no hidden indication is detected, a new session is created in step S203.

According to the second example of the load sharing mechanism, an internal session identifier (ISId) is detected based on the hidden indication. This alternative includes the above mechanism of the first example, i.e. if the ISId cannot be discovered, we can assume, that the request belongs to a new call leg.

In the second example, a hidden indication is provided e.g. in the Record-Route header field and in the Via header field of the SIP request. Thus, referring to FIG. 5, whenever a session-stateful CSCF, e.g. the S-CSCF 40, inserts a Record-Route or Via header field, it will add a hidden indication, containing information about the internal session identifier (ISId).

Figure 7:
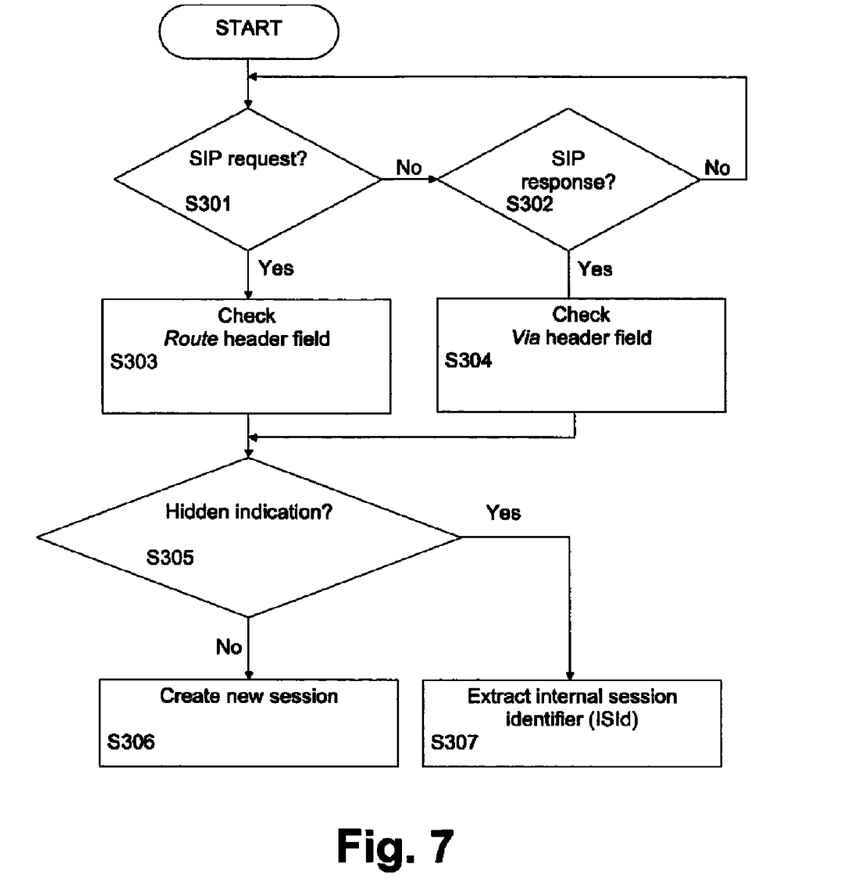
FIG. 7 shows a flow diagram of a second example of a load sharing mechanism according to the second preferred embodiment.

FIG. 7 shows a schematic flow diagram indicating the enhanced load sharing mechanism according to the second example. Whenever a message arrives, it is checked whether the message corresponds to a SIP request (step S301). If so, the session-stateful CSCF checks in step S303 whether the topmost Route header field contains a hidden indication. If it is determined in step S305 that the hidden indication is present, the session is existing and the ISId can be extracted to provide a fast session recognition and allocation function (step S307). If not, a new session has to be created in step S306. If no SIP request is detected in step S301, it is checked in step S302 whether the message corresponds to a SIP response. If so, the session-stateful CSCF checks in step S304 whether the topmost Via header field contains a hidden indication. If it is determined in step S305 that the hidden indication is present, the session-stateful CSCF extracts the ISId from the topmost Via header field of the SIP response (step S307).

Hence, even a quick identification of an existing session can be provided at the CSCFs.

As in the first example, the hidden indication can be part of the hostname. As an example, it is assumed that the default routing to this element would be <scscf17.operator.net> such as <B@provider.net; maddr=scscf17.operator.net>. Then, the Route header field could look like the following. The Route header field is constructed from the Record-Route header field.
Route: <B@provider.net; maddr=ISId224497.scscf17.operator.net>
or
Route: <B@ISId224497.provider.net>
or
Route: <B@ISId224497.scscf17.operatornet>.

Here, the ISId is "224497" as part of the hostname. The user part 120 may be empty.
Similarly, the Via header field could be used, which could then look like:
Via: SIP/2.0/UDP ISId224497.scscf17.operator.net:5060
All the SIP responses which contain "ISId224497" as part of the hostname, belong the same existing session.

As an option, the ISId as part of the hostname could also be encrypted/tokenized for hiding or redundancy purposes.

As an alternative, the S-CSCF 40 may add a "rr-param" to the Record-Route header field as defined in RFC3261.
Similarly, this works for SIP responses, where the Via header field would be extended by a "via-extension" as defined in RFC3261:
Via=("Via"/"v") HCOLON via-parm *(COMMA via-parm)

via-parm=sent-protocol LWS sent-by *(SEMI via-params)

$$via\text{-}params = via\text{-}ttl\,/\,via\text{-}maddr$$
$$/\,via\text{-}received\,/\,via\text{-}branch$$
$$/\,via\text{-}extension$$

via-ttl="ttl" EQUAL ttl
via-maddr="maddr" EQUAL host
via-received="received" EQUAL (IPv4address/IPv6address)
via-branch "branch" EQUAL token
via-extension=generic-param
sent-protocol=protocol-name SLASH protocol-version SLASH transport
protocol-name="SIP"/token
protocol-version=token $$transport = \text{"UDP"}\,/\,\text{"TCP"}\,/\,\text{"TLS"}\,/\,\text{"SCTP"}$$
$$/\,other\text{-}transport$$

sent-by=host [COLON port]
ttl=1*3DIGIT; 0 to 255
generic-param=token [EQUAL gen-value]
gen-value=token/host/quoted-string $$token = 1*(alphanum\,/\,\text{"-"}\,/\,\text{"."}\,/\,\text{"!"}\,/\,\text{"%"}\,/\,\text{"*"}$$
$$/\,\text{"\_"}\,/\,\text{"+"}\,/\,\text{"`"}\,/\,\text{"'"}\,/\,\text{"} \sim \text{"})$$

As an example, the Route header field could then look like the following. The Route header field is constructed from the Record-Route header field.
Route: <B@provider.net; maddr=scscf17.operator.net; ISId=224497>
or
Route: <B@provider.net; ISId=224497>.
or
Route: <B@scscf17.operator.net; ISId=224497>.
Here, the ISId is "224497" as parameter of the Route header field.
The corresponding Via header field could then look like:
Via: SIP/2.0UDP scscf17.operator.net:5060; ISId=224497.
In this case, all the SIP responses which contain the parameter "ISId=224497" belong to the same existing session.
Optionally, the ISId as part of the hostname could also be encrypted/tokenized for hiding or redundancy purposes.

According to a further alternative, different port numbers may be used for all existing sessions:
As an example, it is assumed that the default routing to the concerned element would be <B@provider.net; maddr=scscf17.operator.net>, the Route header field could then look like the following. The Route header field is constructed from the Record-Route header field.
Route: <B@provider.net; maddr=scscf17.operator net: 224497>
or
Route: <B@provider.net: 224497>
or
Route: <B@scscf17.operator.net. 224497>.

User part may be empty. All the SIP requests, which arrive e.g. at port 224497, then belong the same existing session. Similarly, this works for the Via header field, which could look like:
Via: SIP/2.0/UDP scscf17.operator.net: 224497
Here, all the SIP responses, which arrive at port 224497, belong the same existing session.

However, listening to many ports in parallel might cause performance or scalability problems.

As another alternative, a new proprietary extension header field may be used in SIP to convey the hidden information. As an example, the new extension header field may look like:
CSCF-session: "ISId=224497 in scscf17.operator.net"
However, as already mentioned in connection with the first example, the UA would have to support this feature, i.e. copying this new header field from the SIP requests to the SIP responses and subsequent SIP requests. As a still further alternative, the payload portion of the SIP request or response could be used for this too.

Mainly, the above load sharing mechanisms are provided in CSCFs or other network nodes with corresponding functionality. However, in general, they may also be implemented in terminal devices, such as the UE 10.

It is noted that the present invention is not restricted to the preferred embodiments described above. The present invention may be implemented in any network node having a load control functionality in any network. In particular, any header or payload fields of any packet data message or datagram may be used. Furthermore, any information usable for load control can be conveyed. The embodiments may thus vary within the scope of the attached claims.

What is claimed is:

1. A method, comprising:
   receiving at a network node of a public land mobile network a message, wherein the message includes a load control information set in a predetermined field of a layer three or above message, wherein the load control information is separate from addressing information for said message;
   routing said message in a packet data network of the public land mobile network;
   checking, at the network node of the public land mobile network, said load control information on the routing path of said message, wherein the routing path includes the network node of the public land mobile network; and
   selecting, by the network node of the public land mobile network, a processing resource of said packet data network in response to the result of said checking of said load control information.

2. A method according to claim 1, wherein the load control information provides information to enable the network node, rather than an application server, to load balance to substantially equalize the load among nodes of an internet protocol multimedia subsystem of the public land mobile network.

3. A method according to claim 1, wherein said predetermined field is a via branch of a session initiation protocol message, wherein said message is a session initiation protocol message.

4. A method according to claim 3, further comprising:
   copying said load balancing information from another predetermined field to said predetermined field.

5. A method according to claim 2, wherein said address header is an uniform resource indicator of a session initiation protocol route header.

6. A method according to claim 2, further comprising:
   providing a plurality of subfields in said user part for conveying different types of said load control information.

7. A method according to claim 6, wherein said user part is parsed and divided into said subfields.

8. A method according to claim 6, wherein the structure, order and usage of said subfields are predetermined.

9. A method according to claim 6, wherein said subfields are separated by a predetermined bit string, character, or character string.

10. A method according to claim 1, wherein a virtual address is shared by a plurality of processor nodes.

11. A method according to claim 10, wherein said processor node has a call state control functionality of an internet protocol based cellular network.

12. A method according to claim 2, wherein said load control information comprises a first port number indicating a first port for receiving a request message.

13. A method according to claim 2, wherein said load control information comprises a second port number indicating a second port for receiving a response message.

14. A method according to claim 1, wherein said load control information comprises a first information indicating whether a session of said message is already existing.

15. A method according to claim 14, wherein said load control information comprises a second information indicating an identification of said existing session.

16. A method according to claim 14, wherein said load control information is a hidden information not meaningful to other networks.

17. A method according to claim 14, wherein said load control information is set as a part of a host name.

18. A method according to claim 14, wherein said load control information
is set in a payload portion of said message.

19. A method according to claim 15, further comprising:
extracting said second information in response to a detection of said first information; and
using said second information for said selection of a processing resource.

20. The method of claim 1, wherein the public land mobile network comprises a plurality of public land mobile networks.

21. An apparatus, comprising:
at least one processor and at least one memory including code which when executed provides at least
receive, at a network node of a public land mobile network a message, wherein the message includes a load control information set in a predetermined field of a layer three or above message, wherein the load control information is separate from addressing information for said message,
route said message in a packet data network of the public land mobile network,
check, at the network node of the public land mobile network, said load control information on the routing path of said message, wherein the routing path includes the network node of the public land mobile network, and
select, at the network node of the public land mobile network, a processing resource of said packet data network in response to the result of said checking of said load control information.

22. An apparatus according to claim 21, wherein said apparatus comprises a call state control functionality of an internet protocol based cellular network.

23. An apparatus according to claim 21, wherein said selector is configured to select a predetermined processor node to which said message is distributed.

24. An apparatus according to claim 21, wherein said selector is configured to initiate creation of a new session.

25. An apparatus according to claim 24, wherein said load control information comprises a first information indicating whether a session of said message is already existing.

26. An apparatus according to claim 25, wherein said load control information comprises a second information for identifying said existing session.

* * * * *